Patented Dec. 14, 1948

2,456,595

UNITED STATES PATENT OFFICE 2,456,595

SOLID WATER-REPELLENCY COMPOSITION

Clifford T. Rood, Racine, Wis., assignor to S. C. Johnson & Son, Inc., Racine, Wis.

No Drawing. Application December 26, 1946, Serial No. 718,596

8 Claims. (Cl. 106—270)

This invention relates to a water-repellency composition. More particularly, it relates to an improved water-repellency composition in solid form, which is readily dispersable in hot water, and method for its production.

Heretofore, it has been known to incorporate waxy materials in textiles, yarns or fabrics so as to impart a water-repellent finish to these materials. To accomplish this purpose, the prior art teaches the application of an aqueous dispersion or emulsion of a paraffin wax or oil, which contains a water-soluble salt of aluminum or other multivalent salt. It is also general practice to include in the emulsion or dispersion a protective colloid, such as glue or gelatin. Other emulsifying agents suggested are soaps, sulfonated oils or fats, aromatic sulfonic acids, sulfonated mineral oils and amides.

Although considerable work has been done in this field, the instability of the emulsion in storage or upon dilution has been a major difficulty. Glue and casein are highly water-soluble and if used in sufficient quantities to maintain stable wax dispersions, have a marked tendency to lower the efficiency of the dispersions for obtaining water-repellent effects. The instability experienced in storage has made it very difficult to produce a stable product.

Now, therefore, in accordance with my invention, I have prepared a solid water-repellency composition of matter readily dispersable in hot water comprising paraffin wax, a polyvalent metal salt selected from the group consisting of aluminum formate, aluminum acetate, zirconium acetate, zirconium oxychloride and zirconium ammonium carbonate and a mixed dispersing agent comprising sorbitan monopalmitate and polyoxyalkylene sorbitan monopalmitate in an amount sufficient to readily disperse said composition in a hot aqueous medium to form a stable homogeneous dispersion.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

Seventy parts of paraffin wax, having a melting point of about 130–132° F. were melted in an open vessel. While maintaining the molten wax at about 150° F., 16 parts of emulsifying agent were added to the molten wax with stirring. This emulsifying agent was a mixture of equal parts by weight of sorbitan monopalmitate and polyoxyalkylene sorbitan monopalmitate. There was then added to the molten wax and emulsifying agent, with stirring, 6 parts of water which was at 150° F. There was then slowly sifted into the wax emulsion 8 parts of basic aluminum acetate powder with firm stirring. After all of the basic aluminum acetate powder was added, agitation was continued and the mixture allowed to cool to just above the setting point. The mixture was then poured into cold molds and rapidly chilled. The resulting product was a stable solid water-repellency material readily dispersable in hot water into a stable homogeneous dispersion.

Example 2

Seventy parts of paraffin wax, having a melting point of about 130–132° F. were melted in an open vessel. While maintaining the molten wax at about 150° F., 16 parts of the same emulsifying agent as used in Example 1, were added to the molten wax with stirring. There was then added to the molten wax and emulsifying agent, with stirring, 6 parts of water which was at 150° F. Agitation was continued and the mixture allowed to cool to about setting point and placed in cold molds and rapidly chilled. There was then incorporated in the solid emulsion 8 parts of basic aluminum acetate by passing through a mixing chamber and extruding. The resulting product was a stable solid water-repellency material readily dispersable in hot water into a stable homogeneous dispersion.

Example 3

A water-repellent material for treating textile was prepared by adding 1.2 parts of the solid water-repellency material prepared as in Example 2 to 98.8 parts of water in an open vessel. The water was first heated to about 140° F. and the solid water-repellency material then added to the hot water. The mixture was then stirred slightly until the water-repellency material had been completely dissolved to form a milk-white emulsion. A piece of cotton textile was dipped in this solution and withdrawn and wrung out. It was then damp-dried and ironed. This ironed cotton textile exhibited good water repellency.

Example 4

If the polyvalent metal salts are to be incorporated in a solid form, such as basic aluminum acetate or zirconium oxychloride, the following formulation is suggested:

| | Parts |
|---|---|
| Emulsifier | 15–20 |
| Paraffin wax | 60–80 |
| Polyvalent metal salt | 1–25 |
| Water | 5–15 |

The solid water-repellent composition may be prepared as shown in Example 1 or Example 2.

*Example 5*

If a solution of polyvalent metal salts is to be used such as aluminum formate, the following formulation is suggested:

| | Parts |
|---|---|
| Emulsifier | 15–20 |
| Paraffin wax | 60–80 |
| Aluminum formate solution (23% solids) | 5–20 |

It will be noted that where an aluminum formate solution is added, it will not be necessary to add additional water, as was done in Examples 1 and 2.

From the foregoing examples it will be seen that a method has been provided for preparing a solid water-repellency composition which is readily dispersed in hot water producing a stable homogeneous dispersion.

While in the examples, a mixture of equal parts by weight of sorbitan monopalmitate and polyoxyalkylene sorbitan monopalmitate, has been used as the emulsifying agent, the invention is not limited to this ratio of emulsifying agents. While these two emulsifying agents may be mixed in any ratio sufficient to give a solid composition capable of being readily dispersed in hot water to a stable homogeneous dispersion, in practice it has been found, excellent results are obtained by mixing the emulsifying agents within the range of from about 6:4 and about 4:6 with the 1:1 ratio preferred.

While is might appear that other members of this class of emulsifying agents might be used in replacement of the sorbitan monopalmitate and the polyoxyalkylene sorbitan monopalmitate, up to the present time these specific emulsifiers seem to possess a unique quality not possessed by members of the group as a whole in being able to disperse a water-repellent compound and form a stable solid water-repellency composition which can be readily dispersed in hot water into a stable homogeneous dispersion.

While paraffin wax having a melting point of 130–132° F. has been used in the examples, other crystalline and microcrystalline paraffin waxes may be used regardless of whether they are mixtures of hydrocarbons derived from petroleum, or mineral wax or native paraffin known as ozokerite. Care should be exercised, however, to select a paraffin wax which does not possess a dark color, as it may impart color to the fabric being treated. Colorless or light colored waxes are therefore preferred.

The polyvalent metal salts which will be found to be very satisfactory in this invention are water-soluble salts of polyvalent metals such as aluminum formate, aluminum acetate, zirconium acetate, zirconium oxychloride and zirconium ammonium carbonate.

While the amounts of the various ingredients in the formulation may be varied over a wide range depending upon the various characteristics desired in the water-repellency composition, for all practical purposes the ranges set forth in Examples 4 and 5 will be found sufficient.

In Example 3 the solid water-repellency composition was dispersed in water at a temperature of 140° F. This temperature may be varied, but at this temperature the dispersion is almost instantaneous. Furthermore, the amount of solid water-repellency composition dispersed may be varied according to the particular application and amount of water-repellency desired in the finished textile.

Two different methods of preparing the solid water-repellency composition have been shown in Examples 1 and 2. The invention is not so limited, however, as variations of these methods will undoubtedly occur to those skilled in the art.

From the foregoing description it will readily be appreciated by those who have long been attempting to prepare a stable water-repellency composition, that I have succeeded in preparing a solid water-repellency composition which is easily handled, which can be transported without a large amount of water being included, which is stable during storage, and which is readily dispersable in hot water to form a stable homogeneous dispersion.

Other modes of applying the principle of the invention may be employed instead of those explained, change being made as regards the composition or method herein disclosed, provided the step or steps stated by any of the following claims or the equivalent of such stated step or steps be employed.

I claim:

1. A solid water-repellency composition of matter containing not more than 15% of water by weight and readily dispersable in hot water consisting essentially of paraffin wax, a polyvalent metal salt selected from the group consisting of aluminum formate, aluminum acetate, zirconium acetate, zirconium oxychloride and zirconium ammonium carbonate and a fixed dispersing agent comprising sorbitan monopalmitate and polyoxyalkylene sorbitan monopalmitate in a ratio within the range of from 4:6 to 6:4 by weight.

2. A solid water-repellency composition of matter containing not more than 15% of water by weight and readily dispersable in hot water consisting essentially of paraffin wax, aluminum formate and a mixed dispersing agent comprising sorbitan monopalmitate and polyoxyalkylene sorbitan monopalmitate in a ratio within the range of from 4:6 to 6:4 by weight.

3. A solid water-repellency composition of matter containing not more than 15% of water by weight and readily dispersable in hot water consisting essentially of paraffin wax, aluminum acetate and a mixed dispersing agent comprising sorbitan monopalmitate and polyoxyalkylene sorbitan monopalmitate in a ratio within the range of from 4:6 to 6:4 by weight.

4. A solid water-repellency composition of matter containing not more than 15% of water by weight and readily dispersable in hot water consisting essentially of paraffin wax, zirconium oxychloride and a mixed dispersing agent comprising sorbitan monopalmitate and polyoxyalkylene sorbitan monopalmitate in a ratio within the range of from 4:6 to 6:4 by weight.

5. A solid water-repellency composition of matter containing not more than 15% of water by weight and readily dispersable in hot water consisting essentially of paraffin wax, a polyvalent metal salt selected from the group consisting of aluminum formate, aluminum acetate, zirconium acetate, zirconium oxychloride, and zirconium ammonium carbonate and a mixed dispersing agent comprising sorbitan monopalmitate and polyoxyalkylene sorbitan monopalmitate in equal parts by weight.

6. A solid water-repellency composition of matter containing not more than 15% of water by weight and readily dispersable in hot water consisting essentially of paraffin wax, aluminum formate and a mixed dispersing agent comprising sorbitan monopalmitate and polyoxyalkylene sorbitan monopalmitate in equal parts by weight.

7. A solid water-repellency composition of matter containing not more than 15% of water by weight and readily dispersable in hot water consisting essentially of paraffin wax, aluminum acetate and a mixed dispersing agent comprising sorbitan monopalmitate and polyoxyalkylene sorbitan monopalmitate in equal parts by weight.

8. A solid water-repellency composition of matter containing not more than 15% of water by weight and readily dispersable in hot water consisting essentially of paraffin wax, zirconium oxychloride and a mixed dispersing agent comprising sorbitan monopalmitate and polyoxyalkylene sorbitan monopalmitate in equal parts by weight.

CLIFFORD T. ROOD.

REFERENCES CITED

The following references are of record in the file of this patent:

UNITED STATES PATENTS

| Number | Name | Date |
| --- | --- | --- |
| 2,015,865 | Muller | Oct. 1, 1935 |
| 2,046,305 | Cleaveland | June 30, 1936 |
| 2,206,090 | Haggenmacher | July 2, 1940 |
| 2,328,431 | Doser et al. | Aug. 31, 1943 |
| 2,374,931 | Griffin | May 1, 1945 |
| 2,380,166 | Griffin | July 10, 1945 |

OTHER REFERENCES

Spans and Tweens—Published by Atlas Powder Co., June, 1945, pages 2 and 12.